United States Patent Office 2,781,307
Patented Feb. 12, 1957

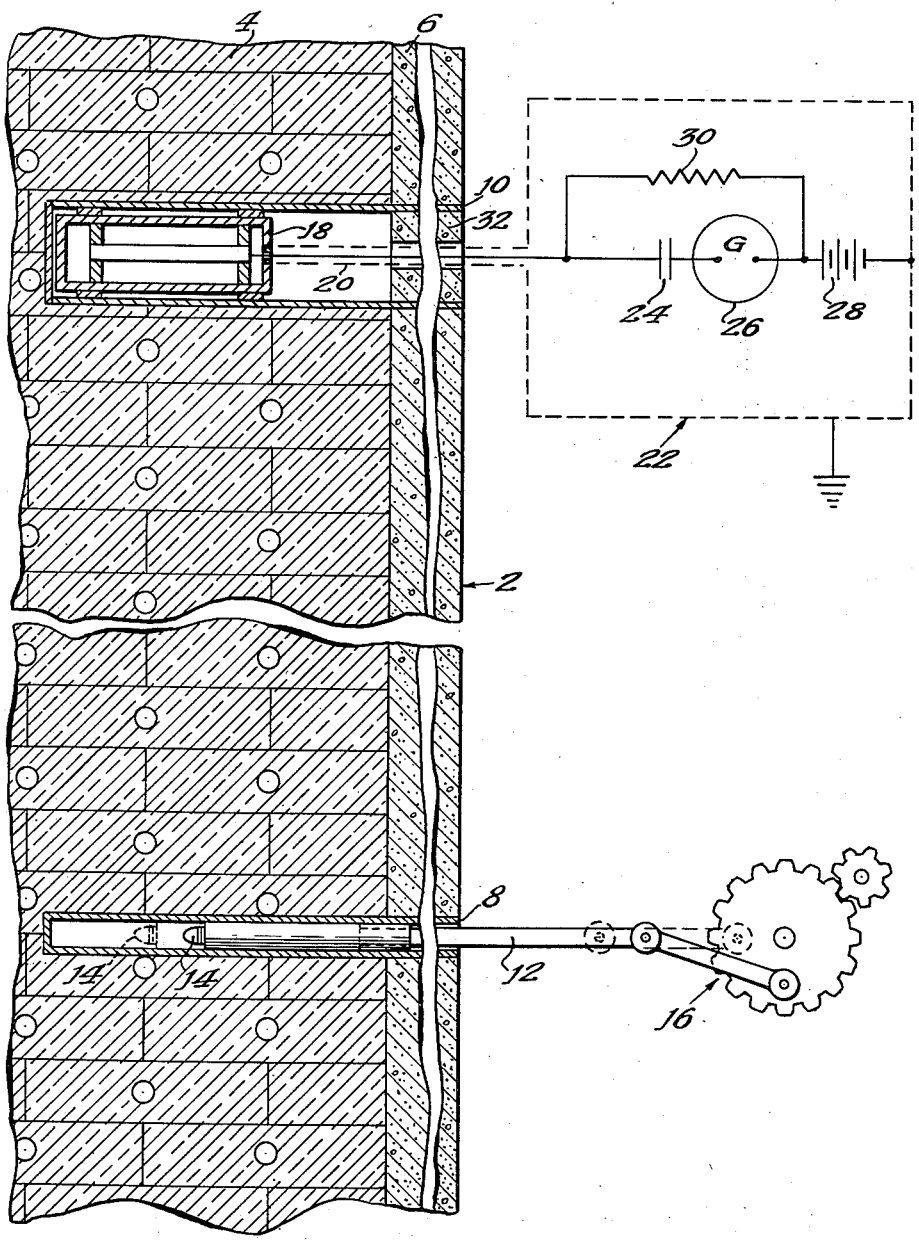

2,781,307

APPARATUS FOR THE MEASUREMENT OF NEUTRON ABSORPTION

Eugene P. Wigner, Oak Ridge, Tenn., assignor to the United States of America as represented by the United States Atomic Energy Commission Application March 4, 1947, Serial No. 732,324

1 Claim. (Cl. 204—193)

This invention relates to an improved apparatus for the measurement of neutron absorption characteristics of materials. More specifically the invention relates to an improved apparatus for measuring the effect of the presence of the sample under measurement on the neutron reproduction factor, and thus the power output, of a neutronic reactor capable of sustaining a nuclear fission chain reaction.

An important consideration in selection of non-reacting materials for use in a neutronic reactor is the neutron absorption of the material to be used. As is now well-known, the use or accidental presence of materials having a high absorption for neutrons in a neutronic reactor requires that the size of the reactor be increased in order to have a neutron reproduction factor great enough so that the chain reaction may be self-sustaining. If non-fissionable materials having high absorption for neutrons are present in sufficient quantities production of a divergent chain reaction may be rendered impossible altogether. It is, therefore, necessary in analyzing materials to be used in the construction of a neutronic reactor to determine the neutron absorption of such materials.

The most sensitive and effective general method of measuring the absorption of neutrons of a material now known is the insertion of a sample of the material under scrutiny into an operating neutronic reactor and observation of its effect upon the operation of the reactor. In the past, two ways of employing this general method have been used. In one of these two a sample of the material is plunged into a standard position in the reactor which reactor was theretofore running at a constant power level. As is well known in the art, the insertion of the additional absorber reduces the neutron reproduction factor of the reactor by an amount dependent upon the neutron absorption of the absorber. The neutron reproduction factor is thus reduced below unity and the power output of the reactor falls at an approximately exponential rate. The speed of falling of the power output is a function of the amount of absorber thus inserted. If the speed of falling be calibrated in terms of standard quantities of a material of known neutron absorption characteristics, for example pure boron, then the measurement of the rate of fall with the insertion of a known quantity of the material of unknown neutron absorption characteristics constitutes a measure of the absorption characteristics of such material in terms of the ratio to the absorption characteristics of the known material.

A second way of applying the general method likewise employs the step of plunging the sample under measurement into a reactor theretofore run at a constant power output; but in this method, the insertion of the absorber is compensated by withdrawing another absorber of known characteristics as for example a boron control rod, such withdrawal being adjusted until the effect of the sample is nullified and the reactor is again running at a constant level of power output. Under these circumstances the amount of known absorber withdrawn in order to reinstate the condition of constant power output constitutes a measure of the absorption characteristics of the unknown absorber thus introduced. This latter method may be termed the "null" method of measuring neutron absorption by effect on the operation of a neutronic reactor.

The above methods heretofore used are adequate in cases where either the absorber under measurement has a high nuclear cross-section for neutron absorption or where large quantities of the sample under measurement are available to be inserted into the reactor for the purpose of making the measurement. The limitation on these methods, both as to accuracy and sensitivity, lies in the commonly observed fact that neutronic chain reactors, even through reasonable precautions are taken to maintain all conditions constant, undergo random changes and perturbations in both the neutron reproduction factor and instantaneous power output. In the methods previously in use as described above, such variations, which are caused by conditions other than the insertion of the absorber under measurement, such as temperature and barometric pressure for example, are indistinguishable from the variations caused by the absorber, which latter variations constitute the measure of the absorption characteristics.

It is, therefore, the principal object of this invention to provide an improved apparatus for the measurement of neutron absorption characteristics of samples of materials.

Generally, the teaching of this invention is an apparatus wherein the sample under scrutiny is oscillated in position at a periodic rate between portions of the reactor of greater and lesser neutron density, thus periodically varying the effectiveness of the absorber in reducing the neutron reproduction factor of the chain reactor, and accordingly varying the power output of the reactor with the same frequency. The measurement is then accomplished by means of a device which is capable of measuring the periodic fluctuations so induced. In this manner random fluctuations induced by causes other than the absorber may be distinguished and the limitations upon sensitivity and accuracy heretofore existing as stated above may be minimized.

For a better understanding of the invention, reference is made to the single figure of the drawing in which appears a schematic illustration of an apparatus for measuring neutron absorption characteristics of a sample of material including a neutronic reactor shown fragmentarily in cross-section in the drawing.

In the drawing, the neutronic reactor is generally designated by the numeral 2. It comprises, as is well-known in the art, an active portion 4, containing a fissionable material such as $U^{235}$ and preferably a quantity of neutron moderator such as graphite, and a biological shield 6, for example a thick wall of concrete, to prevent dangerous radioactive emanations to the exterior of the reactor 2. It will be understood that the present invention is not in any way limited to the particular type of neutronic reactor 2 illustrated in the drawing, which is shown for illustrative purposes only.

A shell or thimble 8 extends from the exterior surface of the reactor 2 through the shield 6 and into the active portion 4 of the reactor. A second shell or thimble 10 likewise extends from the face of the reactor 2 into the active portion 4. Both of these thimbles 8 and 10 are preferably of a material of low cross-section for neutrons, for example stainless steel. Into the thimble 8 extends a rod or piston 12 likewise of a material of low neutron absorption. Fastened to the inner end of the piston 12 is a capsule containing the sample 14 under measurement. The piston 12 has imparted to it periodic reciprocating motion by a mechanism 16 illustrated in the drawing merely as a disc-and-crank drive driven by motor means not shown in the drawing. It will be understood that the mechanism 16 for imparting reciprocating motion to the piston 12 is merely illustrative and constitutes in itself no part of the present invention. The teachings of the present invention may be applied with any mechanism whatever for imparting motion to the sample 14, such motion being adapted to change periodically the position of the sample 14 as regards the neutron intensity distribution within the reactor 2. In the illustration of the drawing the thimble 8 acts as a bearing block for the piston 12.

Inserted within the thimble 10 is a neutron responsive ionization chamber 18. The thimble 10 has a shielding plug 32 at the outer end thereof to prevent the existence of a beam of intense radioactivity from the reactor 2. The ionization chamber 18 is connected electrically to the exterior by a shielded coaxial cable 20. The shield of the coaxial cable 20 is connected to one electrode of the ionization chamber 18 and is externally connected to an electromagnetic shield 22, at ground potential, containing the remainder of the measuring equipment. The other electrode of the ionization chamber 18 is connected to a condenser 24, a galvanometer 26, and a power supply 28, all in series. One terminal of the power supply 28 is connected to the shield 22 and thus to ground. A resistor 30 is connected in parallel with the condenser 24 and the galvanometer 26.

Having thus described the elements appearing in the drawing, operation of the device illustrated may now be explained. As is well-known in the art, at any level of power operation the neutron flux density within the reactor 2 is not uniform therein. The maximum flux density occurs at the center of the active portion 4; thence the flux density diminishes. It is much smaller at the periphery of the active portion 4 than at the center. The neutron flux density continues to diminish throughout the shield 6. It will readily be seen that a neutron absorber which is placed at the center of the active portion 4 has a much greater effect upon the neutron reproduction factor of the reactor than it has when placed at the periphery of the active portion 4 or in the shield 6. If the neutron reproduction factor be adjusted by control means well known in the art and therefore not shown in the drawing so that the reactor 2 operates at a constant level of power output with a neutron absorbing sample 14 at some position intermediate between the center of the active portion 4 and the periphery of the active portion 4, and if such sample 14 then be oscillated back and forth, the neutron reproduction factor, and thus the power output, periodically fluctuates above and below the preset value. For any given period and amplitude of mechanical oscillation the amplitude of the periodic variations so induced is a function of the neutron absorption characteristics of the sample 14 so caused to oscillate. Persons skilled in the art will readily observe that since the position of the sample 14 affects the neutron reproduction factor, and thus the rate of change of the power output, rather than the power output itself, the phase of the variation of power output with respect to the position of the sample 14, is such that the latter leads the former.

The ionization chamber 18 is responsive to the instantaneous power output of the reactor 2, and allows a flow of current proportional to the instantaneous power output. When the instantaneous power output is caused to fluctuate periodically around a mean value, the current through the ionization chamber 18 correspondingly fluctuates around the mean value. The current through the ionization chamber flows through the parallel combination of the resistor 30 and the condenser 24 and galvanometer 26, which latter two elements are in series. As is well-known in the art, once the condenser 24 has attained a charge corresponding to the mean level of operation, the current corresponding to this mean level no longer flows through the galvanometer 26. However, fluctuations in the value of power output of the reactor 2, and thus of current through the ionization chamber 18, cause corresponding flow of current through the galvanometer 26, the condenser 24 charging and discharging in accordance with such fluctuations. If the fluctuations have a periodic component the galvanometer 26 thus has a periodically varying indication. The amplitude of the variation is a measure of the amplitude of the variation of the current in the ionization chamber 18 and thus of the variation of the power output of the chain reactor 2. The latter is in turn a measure of the neutron absorption of the sample 14 so caused to oscillate in position.

In order to maximize the discrimination of the system against random variations, it is desirable that the period of the galvanometer 26 be the same as the period of the oscillations of the piston 12. As is well-known in the art, under such conditions the response of the galvanometer 26 to the component of the signal from the ionization chamber 18 of the frequency of the oscillation of the piston 12 is maximized and the response of the galvanometer 26 to signal components of other frequencies is minimized. Thus the neutron absorption of the sample 14 may be measured to an accuracy which is not limited by stray variations of reactor operating conditions except to the extent that such stray variations occur at the same frequency as the variations induced by oscillating the sample 14. It will be understood that in random variations there may be present a component of the same frequency as that of the signal created by the oscillation of the absorbing sample 14. However, such effects, if present, are obviously much smaller and less prejudicial to accuracy than in a system in which such frequency discrimination does not occur.

In the embodiment of the invention illustrated in the drawing, the ionization chamber 18 may be, for example, filled with boron trifluoride gas to render it neutron sensitive, such ionization chambers being well-known in the art. The galvanometer 26 may have a period, for example, of 20 seconds; the condenser 24 may have a value, for example, of 32 microfarads; and the resistor 30 may be, for example, one-half megohm. The voltage value of the power supply 28 will, of course, as is well-known in the art, depend upon the specific design of the ionization chamber 18. The period of the oscillatory motion of the piston 12 may be, for example, 20 seconds, to correspond with the natural period of the galvanometer 26.

It has been stated above that the current through the ionization chamber 18 is proportional to the power output of the reactor 2. However, it should be understood that the term "proportional" is herein used in only an approximate sense because the effect which the oscillating absorbing sample 14 has on the neutron flux through the ionization chamber 18 is to some extent a function of the distance by which these two elements and the thimbles 8 and 10 containing them are separated in the reactor 2. It will be understood that strictly direct proportionality exists only if the ionization chamber 18 is at such a great distance from the absorbing sample 14 that the effect of the absorbing sample 14 on the neutron flux incident upon the ionization chamber 18 is confined to that which arises because of overall change in the reproduction factor of the reactor 2 rather than upon a shielding effect which the sample 14 may assert upon the ionization chamber 18 by reason of being in proximity thereto and therefore absorbing neutrons which would otherwise impinge upon the ionization chamber 18 or would induce fissions which would produce neutrons which would in turn impinge upon the ionization chamber 18. The variation of neutron flux in the vicinity of the absorber will clearly be greater than the variation of the over-all power output of the reactor. Thus if the ionization chamber or other detector is near the oscillating absorber, the amplitude of the signal produced by the oscillation of any given absorber is maximized. However, in such a case errors may be introduced by reason of differences as to neutron energy dependence between the absorption characteristics of the sample and the response characteristics of the detector.

The teachings of the present invention as disclosed in the drawing and in the above description will be readily adapted by persons skilled in the art to many variants of the device and method illustrated and described. For example, many equivalent methods and devices wherein a sample is caused to move periodically between regions of high and low density in a neutronic reactor may readily be devised. Likewise, the ionization chamber and the associated galvanometer circuit are merely illustrative of the many ways in which the variations of the neutron flux or the power output of a neutronic reactor caused by the motion of an absorbing sample may be measured.

What is claimed is:

An apparatus for obtaining an indication of an electrical impulse directly proportional in magnitude to the neutron absorption of a sample of a substance, comprising a neutronic reactor having regions of different neutron flux density, a sample, means for moving the sample at a fixed frequency from a region of one neutron flux density to another region having a different neutron flux density in order to produce a variation at said frequency in the power output of the reactor, the sample size being smaller than the required mass of neutron absorber necessary to depress the neutron reproduction coefficient of the reactor to a value less than unity, an ionization chamber positioned within the neutron atmosphere and responsive to the reactor power output variation, and a meter coupled to the ionization chamber for measuring the amplitude of the reactor power output variation and possessing a natural period equal to the frequency of the periodic sample movement.

References Cited in the file of this patent

UNITED STATES PATENTS

| | | |
|---|---|---|
| 2,275,747 | Fearon | Mar. 10, 1942 |
| 2,624,847 | Jesse et al. | Jan. 6, 1953 |
| 2,651,726 | Froman et al. | Sept. 8, 1953 |

FOREIGN PATENTS

| | | |
|---|---|---|
| 114,151 | Australia | May 3, 1940 |
| 233,011 | Switzerland | Oct. 2, 1944 |
| 233,278 | Switzerland | Oct. 16, 1944 |

OTHER REFERENCES

Korff et al.: Phy. Rev. 55, 980, May 15, 1939.

A General Account of the Development of Methods of Using Atomic Energy for Military Purposes, H. D. Smyth (August 1945), pp. 85, 179.